United States Patent [19]

Rose et al.

[11] 3,931,801
[45] Jan. 13, 1976

[54] FUEL VAPORIZER AND CONTROL SYSTEM

[76] Inventors: William L. Rose, 2114 Rhonda St.; Herbert J. Johnson, 1250 Bluebell St., both of Oxnard, Calif. 93030

[22] Filed: Feb. 21, 1974

[21] Appl. No.: 444,361

[52] U.S. Cl. ............... 123/134; 123/133; 123/122 E
[51] Int. Cl.² ......................................... F02M 17/22
[58] Field of Search ........ 123/133, 134, 25 D, 25 E, 123/25 F, 122 A, 122 R, 122 E, 34 R, 34 A

[56] References Cited
UNITED STATES PATENTS

| 610,159 | 8/1898 | Speer | 123/134 |
|---|---|---|---|
| 706,454 | 8/1902 | Robinson | 123/134 |
| 1,530,882 | 3/1925 | Chapen | 123/122 E |
| 1,629,898 | 5/1927 | Williams | 123/134 |
| 2,269,930 | 1/1942 | Ericson et al. | 123/122 H |
| 2,862,490 | 12/1958 | Trisier | 123/122 H |
| 3,411,489 | 11/1968 | Kruger | 123/133 |
| 3,447,511 | 6/1969 | Beard et al. | 123/133 |
| 3,713,429 | 1/1973 | Dwyre | 123/134 |
| 3,738,334 | 6/1973 | Farr | 123/133 |
| 3,800,533 | 4/1974 | Zankowski | 123/134 |

*Primary Examiner*—Charles J. Myhre
*Assistant Examiner*—R. H. Lazarus
*Attorney, Agent, or Firm*—Ralph B. Pastoriza

[57] ABSTRACT

Exhaust gases in an internal combustion engine are circulated into a chamber containing liquid fuel, the exhaust gases bubbling through the fuel to heat and vaporize the fuel prior to passing the fuel for mixing with air at the entrance to the intake manifold.

7 Claims, 5 Drawing Figures

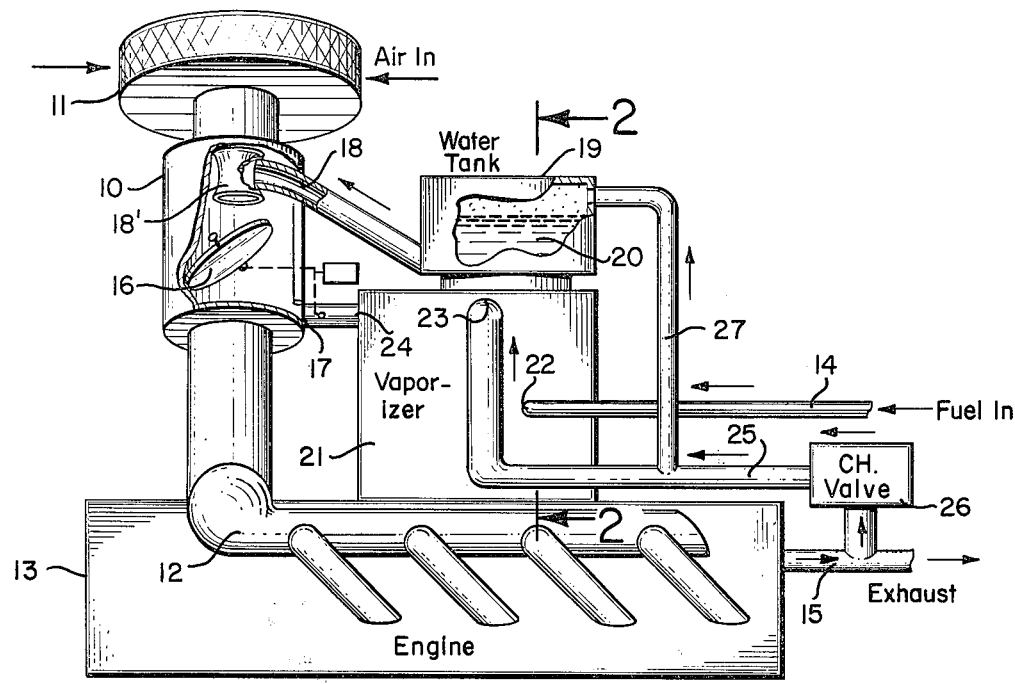
FIG. 1
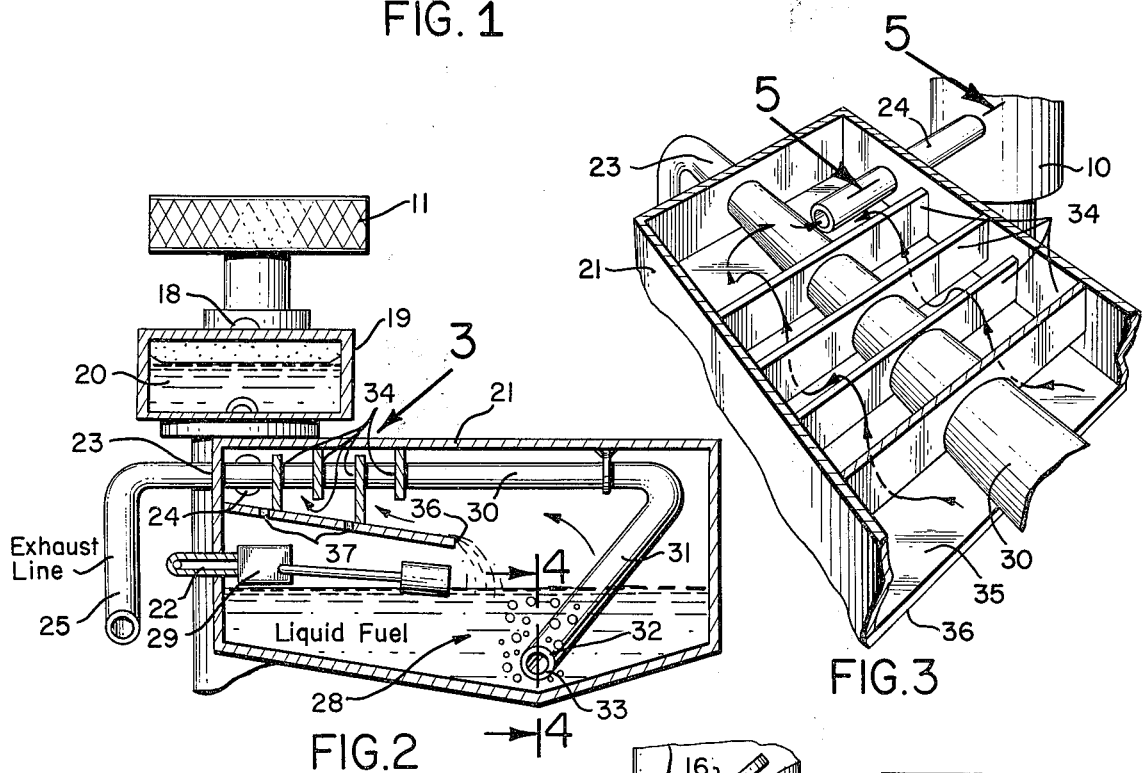
FIG. 2
FIG. 3
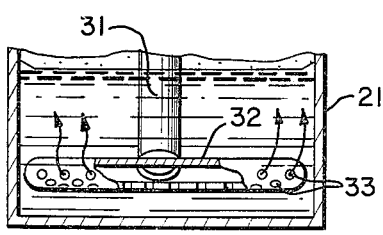
FIG. 4
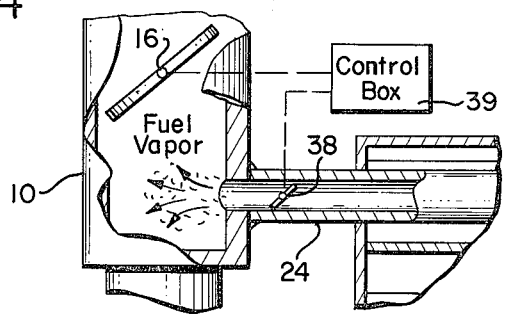
FIG. 5

FUEL VAPORIZER AND CONTROL SYSTEM

This invention relates generally to internal combustion engines and more particularly to an improved fuel vaporizer and control system for improving the burning efficiency in internal combustion engines.

BACKGROUND OF THE INVENTION

Present day automobile engines utilize a mixture of liquid fuel (gasoline) and air in the carburetor for burning in the engine. The basic problems associated with this approach include the following:

1. The liquid droplets mixed with the air tend to collect on the manifold walls whenever a change in direction occurs resulting in uneven distribution of the fuel to the cylinder. The uneven fuel distribution makes it necessary to enrich the mixture to ensure that the leanest cylinder receives a sufficient charge of fuel. The droplet collection tendency is further increased under increasing load and speed conditions which make it necessary to further enrich the mixture to compensate for the droplet collection in addition to the necessary enrichment for increasing load and speed. Such fuel enrichment results in decreased thermal efficiency and an increase in unburned hydrocarbons and carbon monoxide emitted in the exhaust gas.

2. Leaning the mixture to minimize the hydrocarbon and carbon monoxide emission results in a drastic loss of power compounded by the uneven distribution of fuel. Further, an increase in oxides of nitrogen emitted due to an increase in the average combustion chamber temperature results. Finally, there is a tendency to burn exhaust valves caused by the higher temperature of the exhaust gas passing the exhaust valve which results from the lower flame speed caused by the lean mixture.

The foregoing problem can be alleviated if fuel could be pre-vaporized rather than introduced in the form of a liquid or liquid droplets. U.S. Pat. No. 3,667,436 issued June 6, 1972 to Robert Reichhelm discloses a fuel gassification system for internal combustion engines. Essentially, Reichhelm feeds back part of the exhaust gases to heat and aid in vaporizing liquid fuel.

BRIEF DESCRIPTION OF THE PRESENT INVENTION

The present invention involves the provision of a fuel vaporizer and control system which utilizes the heat and pressure available in the exhaust gas to atomize and vaporize the liquid fuel by intimate mixing thereof. In a broad sense, the present invention is similar in principle to the teachings of the Reichhelm patent, referred to heretofore. On the other hand, the present invention provides a greatly improved structural arrangement for effecting a far more efficient vaporizing of the fuel than has been possible heretofore.

Briefly, the invention contemplates the provision of a pipe section arranged to be inserted between the air intake and input manifold of an internal combustion engine. This pipe section includes a butterfly valve and a fuel vapor inlet below the valve. A vaporizer unit in turn comprises a closed chamber having a liquid fuel inlet connected to receive liquid fuel for the engine, an exhaust gas inlet and a fuel vapor outlet.

Exhaust branch pipe means including a one-way check valve connect to pass exhaust gases from the engine to the exhaust gas inlet in the chamber. A liquid fuel reservoir is provided in the lower portion of the chamber together with a float valve control to maintain the level of liquid fuel in the chamber at a desired given level, this fuel being received from the usual fuel pump.

Within the chamber there is provided an exhaust pipe connecting means passing from the exhaust inlet through the upper portion of the chamber and thence extending downwardly into the liquid fuel to terminate beneath the surface of the liquid fuel. The terminal end of this connecting means beneath the liquid level includes a plurality of outlet ports so that exhaust gases can only escape into the chamber by bubbling up through the liquid fuel, thereby vaporizing the fuel.

Further vaporization is accomplished by a baffle means along the exterior portion of the pipe connecting means in the upper portion of the chamber, the baffle means and exterior pipe portion being heated by the exhaust gases. The fuel vapor outlet passes from the chamber at a point adjacent to the exhaust gas inlet and connects into the fuel vapor inlet in the pipe section.

Hot exhaust gases passing through the exhaust pipe connecting means and bubbling through the liquid fuel vaporize the same and the vaporized fuel passing along the exhaust pipe connecting means and baffle means in the upper portion of the chamber is thereby further vaporized so that substantially only vaporized fuel passes into the fuel inlet in the pipe section to then mix with air and provide an explosive mixture for the engine.

An additional feature of the invention includes means for introducing water into the pipe section above the butterfly valve. The introduction of this water is by way of a water tank connected to also receive exhaust gases, the pressure thereof contributing to the rate of water introduction into the pipe section.

BRIEF DESCRIPTION OF THE DRAWINGS

A better understanding of the invention will be had by now referring to a preferred embodiment thereof as illustrated in the accompanying drawings in which:

FIG. 1 is a diagramatic showing only of an internal combustion engine in which the fuel vaporizer and control system of this invention has been incorporated;

FIG. 2 is a cross section taken in the direction of the arrows 2—2 of FIG. 1;

FIG. 3 is a fragmentary perspective view broken away to illustrate a portion of the structure looking in the direction of the arrow 3 of FIG. 2;

FIG. 4 is a fragmentary cross section taken in the direction of the arrows 4—4 of FIG. 2; and FIG. 5 is a fragmentary view partly broken away taken in the direction of the arrows 5—5 of FIG. 3.

DETAILED DESCRIPTION OF THE INVENTION

Referring first to FIG. 1, there is shown a pipe section 10 arranged to be inserted between the air intake 11 and input manifold 12 of an internal combustion engine designated by the block 13. The engine 13 may constitute an automobile engine, a stationary internal combustion engine, or any equivalent engine. Regardless of the particular engine involved, there is normally provided a fuel line as indicated to the right at 14 and an exhaust line for exhaust gases as indicated at 15.

In accord with the present invention, the pipe section 10 incorporates an air inlet valve means in the form of a butterfly valve 16 and a fuel vapor inlet 17 below the butterfly valve. Also provided in accord with a preferred embodiment is a water inlet 18 disposed above the butterfly valve. A tank 19 of water 20 is shown connected to the water inlet 18 for passing water into the pipe section 10 through a venturi portion 18'.

Referring now to the structure below the water tank there is shown a fuel vaporizer unit 21 comprising a closed chamber having a liquid fuel inlet 22 connected to receive liquid fuel for the engine in line 14. Also provided is an exhaust gas inlet 23 and a fuel vapor outlet 24.

An exhaust branch pipe means shown at 25 includes a one-way check valve 26 and is connected to pass exhaust gases from the exhaust line 15 to the exhaust gas inlet 23. An auxiliary exhaust pipe branch 27 connects to the exhaust branch pipe means 25 after the check valve 26 to the upper portion of the water tank 19 to provide pressure on the water 20 and thus urge it into the water inlet opening in the pipe section 10.

Referring now to the cross section of FIG. 2, corresponding components described in FIG. 1 are designated by the same numerals. As shown, liquid fuel received in the liquid fuel inlet 22 forms in the lower portion of the chamber 21 and its level is in turn controlled by a float valve 29.

In the upper portion of the chamber there is provided an exhaust pipe connecting means 30 passing from the exhaust inlet 23 along the upper portion and thence turning downwardly as at 31 to pass into the liquid fuel 28 and terminate below the surface of this liquid fuel. In the embodiment illustrated, the termination takes the form of a cross pipe 32 provided with a plurality of ports 33 so that exhaust gases can only escape into the chamber by bubbling up through the liquid fuel. Baffle or separating means 34 are provided in the upper portion.

Also included in the upper portion of the chamber 21 is a plate 35 extending from one wall in the chamber beneath the baffle means and above the liquid fuel level. As shown, this plate slopes downwardly to terminate in a free end 36 short of the opposite wall of the chamber. The plate itself may include enlongated slot openings 37 adjacent alternate baffles, the arrangement being such that any droplets of fuel not completely vaporized on passing about the baffle means are collected by the plate and returned to the liquid fuel in the lower portion of the chamber.

FIG. 3 illustrates more clearly the arrangement of the baffle plate 34 and the connecting exhaust pipe 30 passing therethrough from the exhaust gas inlet 23. These plates 34 are heated by the passing exhaust gases in the pipe 30 by conduction from the surface of the pipe. Moreover, this surface of the pipe is itself quite hot so that when vaporized fuel traverses about the baffles as indicated by the arrows, any fuel not completely vaporized will be substantially completely vaporized by the time it reaches the fuel vapor outlet line 24. Thus, the vaporized fuel is in a saturated condition when it reaches the fuel vapor outlet line 24 since all droplets entrained in the fuel which would result in super saturation have been removed by the baffles.

With respect to the foregoing, it will be noted that the fuel vapor outlet 24 is disposed adjacent the exhaust gas inlet 23 so that the baffle means must be traversed by the vaporized fuel prior to passing from the chamber 21.

FIG. 4 illustrates the termination cross pipe 32 for the exhaust connecting line portion 31 wherein the plurality of ports 33 are shown for releasing gas so that it can bubble up through the liquid fuel.

In FIG. 5, it will be noted that the fuel vapor outlet 24 includes a throttle valve 38. As indicated by the dashed lines, this throttle valve and the butterfly valve 16 are both controlled by a control box 39 which functions to control the position of the throttle valve relative to the butterfly valve in accord with a desired ratio of fuel vapor to air mixture. In other words, the fuel flow per unit time is controlled by the valve 38 while the air flow per unit time is controlled by butterfly valve 16. By controlling simultaneously the position of one valve in response to changes in the position of the other by the control box 39, a desired fuel-to-air mixture ratio can be continuously maintained.

OPERATION

The operation of the improved fuel vaporizer and control system will be evident from the foregoing. Essentially, the structure of the fuel vaporizer chamber incorporating the combination of the liquid level float valve, disposition of the exhaust line connecting means to cause exhaust gases to exit below the level of the liquid fuel, and the baffle arrangement assure substantially complete vaporization of the fuel prior to any mixing with air.

In addition to the foregoing, water from the tank 19 can be fed into the pipe section 10 as described in FIG. 1 at a rate controlled by the pressure of the exhaust gases passed to the tank through the auxiliary exhaust pipe branch 27 and by the venturi effect of 18'.

As a result of complete fuel vaporization, the heretofore described problems associated with droplets of fuel are completely avoided with the result that greater thermal efficiency is realized.

What is claimed is:

1. A fuel vaporizer and control system comprising, in combination:
   a. a pipe section arranged to be inserted between the air intake and input manifold of an internal combustion engine, said pipe section including an air inlet valve means for controlling inlet air flow and a fuel vapor inlet;
   b. a vaporizer unit including a closed chamber having a liquid fuel inlet connected to receive liquid fuel for said engine, an exhaust gas inlet and a fuel vapor outlet;
   c. exhaust branch pipe means connected to pass exhaust gases from said engine to said exhaust gas inlet;
   d. a liquid fuel reservoir in said chamber;
   e. control means within said chamber to maintain the level of liquid fuel in said chamber at a given level;
   f. exhaust pipe connecting means passing from said exhaust gas inlet through a portion of said chamber and thence extending into said liquid fuel to terminate beneath the surface of said liquid fuel, the terminal end of said connecting means beneath said liquid level including outlet means so that exhaust gases can only escape into said chamber by bubbling up through said liquid fuel;
   g. separating means in said chamber, said fuel vapor outlet passing from said chamber at a point following the separating means and connecting into said fuel vapor inlet in said pipe section;
   h. a throttle valve for controlling the flow of vaporized fuel into said fuel vapor inlet; and
   i. control means connected to said throttle valve and air inlet valve means for controlling the flow of fuel and air respectively therethrough to provide a desired ratio of fuel vapor to air whereby hot exhaust gases pass through said exhaust pipe connecting means and bubble through said liquid fuel to vaporize the same, the vaporized fuel passing through the separating means to thereby remove any liquid droplets not vaporized so that substantially only vaporized fuel passes through said throttle valve into said fuel in said pipe section to then mix with air passing through said air inlet valve means and provide an explosive fuel and air mixture at said desired ratio for said engine.

2. A system according to claim 1, in which said pipe section is provided with a water inlet above said valve means; a tank of water; and an auxiliary exhaust pipe branch connecting to said exhaust branch pipe means and to said tank to provide pressure on the water therein and force water into said pipe section.

3. A system according to claim 1, including a plate in said chamber extending beneath said separating means and above said liquid fuel level and sloping downwardly from one wall to terminate short of the opposite wall of the chamber whereby any droplets of fuel not completely vaporized on passing through said separating means are collected by said plate and returned to said liquid fuel in the chamber.

4. A system according to claim 1, in which said separating means comprising baffle means extends along said exterior portion of said pipe connecting means to thereby become heated by exhaust gases passing through the pipe connecting means.

5. A system according to claim 1, in which said point at which said fuel vapor outlet passes from said chamber is adjacent to the exhaust gas inlet.

6. A system according to claim 1, in which said exhaust branch pipe means includes a check valve to block reverse flow of exhaust gases from said chamber.

7. A system according to claim 2 in which said water inlet terminates in a venturi so that incoming air aids in drawing water through said inlet.

* * * * *